United States Patent
Brück et al.

(10) Patent No.: US 6,376,118 B1
(45) Date of Patent: Apr. 23, 2002

(54) FUEL CELL HAVING AN ELECTRODE WITH GAS-PERMEABLE PORES

(75) Inventors: Rolf Brück, Bergisch Gladbach; Andreé Bergmann, Lohmar; Jörg-Roman Konieczny, Siegburg, all of (DE)

(73) Assignee: Emitec Gesellschaft Emmissionstechnologie mbH, Lohmar (DE)

( * ) Notice: Subject to any disclaimer, the term of this patent is extended or adjusted under 35 U.S.C. 154(b) by 0 days.

(21) Appl. No.: 09/699,838

(22) Filed: Oct. 30, 2000

Related U.S. Application Data

(63) Continuation of application No. PCT/EP99/02920, filed on Apr. 29, 1999.

(30) Foreign Application Priority Data

Apr. 30, 1998 (DE) .......................................... 198 19 325

(51) Int. Cl.[7] .................................................. H01M 4/86
(52) U.S. Cl. .............................. 429/41; 429/40; 429/44; 429/30; 429/33; 429/38
(58) Field of Search .............................. 429/30, 33, 38, 429/40, 41, 44

(56) References Cited

U.S. PATENT DOCUMENTS 4,260,469 A  4/1981  McIntyre et al. ........... 204/265

FOREIGN PATENT DOCUMENTS

| DE | 26 18 410 A1 | 11/1976 |
| DE | 43 18 818 C2 | 12/1994 |

*Primary Examiner*—Bruce F. Bell
(74) *Attorney, Agent, or Firm*—Herbert L. Lerner; Laurence A. Greenberg; Werner H. Stemer

(57) ABSTRACT

A fuel cell includes two electrodes of different polarity. A proton-conducting membrane electrolyte is disposed between the two electrodes. At least one of the electrodes has a gas-side surface and an electrolyte-side surface. The electrode has pores which are permeable for a gas from the gas-side surface to the electrolyte-side surface. The pores have respective pore inlet openings and pore outlet openings. The pore inlet openings have a first total area and the pore outlet openings have a second total area smaller than the first total area. As a result of the configuration of the pores, gas can advantageously pass through the electrode more easily. Furthermore, the loss of humidity from the electrolyte is reduced. The fuel cell can be combined with an electromotor to provide an alternative to conventional internal combustion engines, especially in vehicles and rail systems.

11 Claims, 2 Drawing Sheets

FUEL CELL HAVING AN ELECTRODE WITH GAS-PERMEABLE PORES

CROSS-REFERENCE TO RELATED APPLICATION

This application is a continuation of copending International Application No. PCT/EP99/02920, filed Apr. 29, 1999, which designated the United States.

BACKGROUND OF THE INVENTION

Field of the Invention

The present invention relates to a fuel cell having two electrodes of different polarity, between which an electrolyte is provided. The electrode has pores, which are permeable to a fluid, in particular a gas. The pores have pore inlet openings and pore outlet openings and are permeable from a gas-side surface to an electrolyte-side surface.

In fuel cells, just like in other galvanic cells and electrochemical elements, the bonding energy released, for example, when hydrogen ($H_2$) chemically combines with oxygen ($O_2$) is converted into electrical energy and heat. A fundamental distinction is made between low-temperature fuel cells (up to about 200° C.) and high-temperature fuel cells (about 600 to 1100° C.). In between the low-temperature fuel cells and the high-temperature fuel cells, there are so-called molten carbonate fuel cells (MCFCs) with an operating temperature from about 200 to 600° C. and with a liquid electrolyte provided in a matrix.

High-temperature fuel cells, such as oxide-ceramic fuel cells (SOFC; Solid Oxide Fuel Cell) contain, for example, a solid electrolyte composed of zirconium dioxide which conducts ions at an operating temperature of 850 to 1050° C. These are mainly used for local, decentralized power supply systems, particularly in stationary installations.

In conjunction with an electric motor, low-temperature fuel cells could represent an alternative to conventional internal-combustion engines, particularly in vehicles and railroad systems.

In known electrical vehicles, the electrical energy is initially produced in a power station and is then temporarily stored in a battery in the vehicle. High costs, heavy weight, limited life and long charging times for these batteries are problems which have not yet been solved satisfactorily.

Concepts which produce the electricity whenever it is required in the vehicle, and manage without a temporary storage therefore appear particularly promising, in particular the concept of fuel cells with a proton-conducting membrane electrolyte, so-called proton exchange membrane fuel cells (PEM fuel cells). The gaseous fuel, in particular hydrogen gas and oxygen gas, need not be burnt, but is converted directly to electrical energy and steam in a so-called cold reaction. The electrolyte in the PEM fuel cell separates the two gases from one another and prevents a so-called hot reaction. An electrochemical process on the electrolyte allows only protons, that is to say positively charged hydrogen ions ($H^+$), to pass. The electrons of the hydrogen atoms are separated out during this passage and remain behind, and the hydrogen ions react with the oxygen particles on the other side. Excess electrons on the hydrogen side and a lack of electrons on the oxygen side of the electrolyte result in a potential difference between the adjacent electrodes so that, if the electrodes are electrically connected via an external circuit in which a load is connected, an electrical current flows from the anode to the cathode. Apart from the electrical energy, heat and water are produced as reaction products.

The electrolyte in such PEM fuel cells includes a proton-conducting polymer film which is only a few tenths of a millimeter thick. The electrodes are coated with a catalyst containing platinum. However, the polymer film may also alternatively and/or in addition be coated with at least one catalyst on both sides. The catalyst promotes ionization of the hydrogen and the reaction of the hydrogen ions with the oxygen.

The other fuel cell types described initially contain, for example, catalysts composed of Raney nickel, tungsten carbide, molybdenum sulfides, tungsten sulfides or phthalocyanin complexes and other chelate complexes.

Hydrocarbons, in particular methanol and methane, are also used as fuels, alternatively and/or in addition to hydrogen ($H_2$).

In low-temperature fuel cells, in particular PEM fuel cells, the surfaces of the electrolyte and/or the electrolyte-side surfaces of the adjacent electrodes must be kept moist in order to promote the reaction and achieve good efficiencies. To achieve this, it is known, for example, from German Patent No. DE 43 18 818 C2 to operate the fuel cell with moistened gases.

In a stack of series-connected fuel cells, so-called bipolar plates are provided between adjacent fuel cells. These carry the fuel, in particular hydrogen, and respectively carry the air along the gas-side surfaces of the electrodes that is along the inlet openings of the pores in a labyrinthine channel system. Furthermore, they dissipate the reaction heat and provide the electrical connection to the adjacent cell.

The gas, which is supplied at normal pressure or high pressure depending on the type of fuel cell, diffuses through the porous electrode and reacts with the electrolyte, assisted by a catalyst, as described.

A high-power fuel cell system is produced by interconnecting a large number of fuel cells in so-called stacks. The energy output from the system can be produced directly, and controlled precisely, by controlling the supply of hydrogen.

SUMMARY OF THE INVENTION

It is accordingly an object of the invention to provide a fuel cell which overcomes the disadvantages of the heretofore-known fuel cells of this general type and which has an electrode with an improved permeability and porosity for a fluid, in particular for a gas.

With the foregoing and other objects in view there is provided, in accordance with the invention, a fuel cell, including:

two electrodes of different polarity;

a proton-conducting membrane electrolyte disposed between the two electrodes;

at least one of the two electrodes having a gas-side surface and an electrolyte-side surface;

the at least one of the two electrodes being formed with pores, the pores being permeable for a gas from the gas-side surface to the electrolyte-side surface and the pores having respective pore inlet openings and pore outlet openings; and the pore inlet openings have a first total area and the pore outlet openings have a second total area smaller than the first total area.

The electrode of the fuel cell according to the invention is distinguished by the fact that the total area of the pore inlet openings is larger than the total area of the pore outlet openings. This advantageously results in better permeability of the electrode for a fluid, in particular for a gas, and, furthermore, reduces the moisture loss from the layer which is in contact with the electrolyte and the electrolyte-side surface of the electrode.

According to a preferred embodiment of the fuel cell electrode, the total area ratio of pore inlet openings to pore outlet openings is at least 2:1, preferably at least 3:1, and in particular about 4:1. Such a total area ratio particularly assists gas diffusion through the porous electrode.

The pores are preferably at least partially formed in the form of funnels, so that the pores taper from the inlet opening toward the outlet opening.

Alternatively and/or in addition, the pores are at least partially stepped, so that the pore inlet openings have a larger cross section than the pore outlet openings. Such a stepped configuration includes at least a single stepping within the pores and can preferably be achieved, according to the invention, for example, by providing the electrode with at least two layers, namely a gas-side layer and an electrolyte-side layer, wherein the gas-side layer predominantly has pores with a larger cross section than that of the pores in the electrolyte-side layer. Electrodes having a layered construction can be produced easily and cost-effectively.

Electrodes of fuel cells according to the invention which have such a pore structure preferably contain graphite, or are at least partially composed of graphite.

Electrodes which are coated with at least one catalyst are preferably configured such that the catalyst is provided predominantly adjacent to the electrolyte-side surface, preferably in the electrolyte-side pore cross sections. Such a configuration firstly allows to considerably minimize the quantity of catalyst used. The catalyst preferably contains platinum. As a result, the fuel cell can be produced more cost-effectively. Secondly, the catalyst is advantageously provided precisely where it promotes and assists the reactions already described above.

Other features which are considered as characteristic for the invention are set forth in the appended claims.

Although the invention is illustrated and described herein as embodied in a fuel cell having an electrode with pores which are permeable for a fluid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
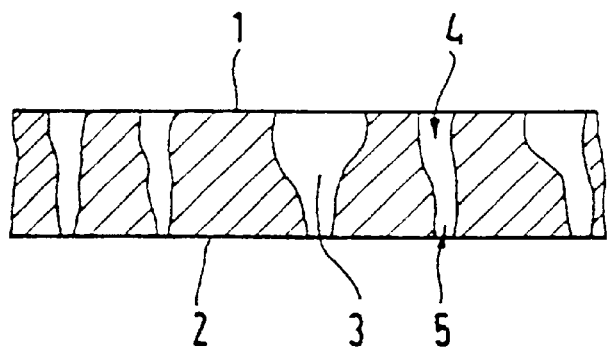
FIG. 1 is a partial sectional view of a single-layer electrode according to the invention.

Referring now to the figures of the drawings in detail and first, particularly, to FIG. 1 thereof, there is shown a sectional view of a single-layer electrode, in particular for PEM fuel cells, with pores 3 which are permeable for a fluid, in particular for a gas, from a gas-side surface 1 to an electrolyte-side surface 2, and with a pore inlet opening 4 and a pore outlet opening 5. The total area, in other words the added-up area, of the pore inlet openings 4 is larger than the total area (added-up area) of the pore outlet openings 5, wherein the total area ratio of pore inlet openings 4 to pore outlet openings 5 is at least 2:1, preferably at least 3:1, and in particular about 4:1. The pores 3 are at least partially in the form of funnels, so that the pores 3 taper from the pore inlet opening 4 toward the pore outlet opening 5. The electrodes are preferably composed of graphite.

Alternatively and/or in addition, the pores 3 can be at least partially stepped, so that the pore inlet openings 4 have a larger cross section than the pore outlet openings 5, corresponding to the total area ratios preferred according to the invention.

Figure 2:
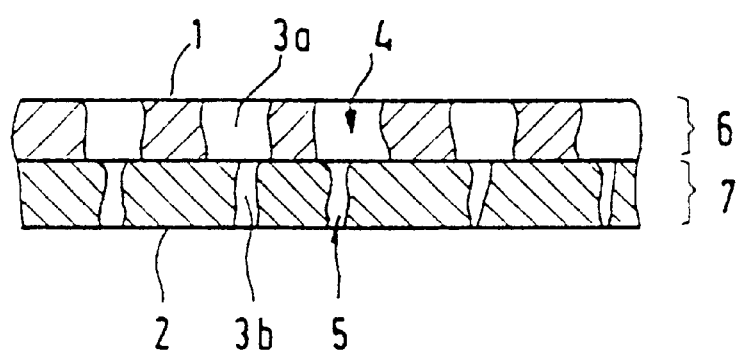
FIG. 2 is a partial sectional view of a two-layer electrode according to the invention.

According to FIG. 2, stepped pores 3 are preferably formed in such a way that the electrode contains at least two layers 6, 7, in particular a gas-side layer 6 and an electrolyte-side layer 7, wherein the gas-side layer 6 predominantly has pores 3a with a larger cross section than that of the pores 3b in the electrolyte-side layer 7.

Figure 3:
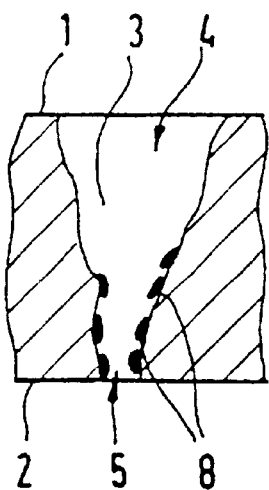
FIG. 3 is a partial sectional view of an enlarged detail of a pore of a single-layer electrode similar to the electrode shown in FIG. 1, wherein the electrode is coated with at least one catalyst.

FIG. 3 is a sectional view of an enlarged detail of a pore of a single-layer electrode as shown in FIG. 1, with the difference that the electrode is coated with at least one catalyst 8. The catalyst 8 is provided predominantly adjacent to the electrolyte-side surface 2, preferably in electrolyte-side pore cross sections.

Figure 4:
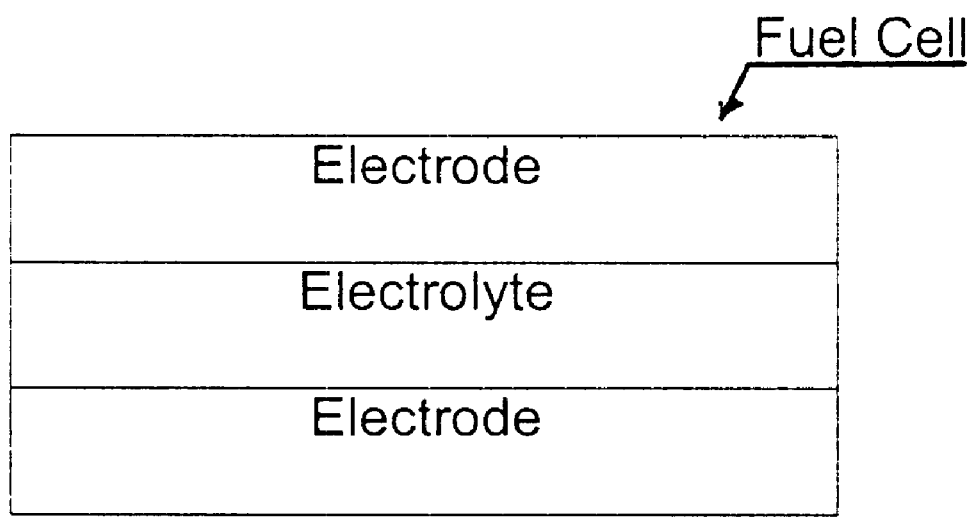
FIG. 4 is a schematic diagram of a fuel cell according to the invention having two electrodes and an electrolyte.

FIG. 4 is a schematic diagram of a fuel cell according to the invention. The fuel cell has two electrodes and an electrolyte, which is disposed between the two electrodes. At least one of the two electrodes is configured in the above-described manner.

Fuel cells according to the invention having the above-described electrodes of different polarity in conjunction with an electric motor are an alternative to conventional internal-combustion engines, in particular in vehicles and railroad systems.

We claim:

1. A fuel cell, comprising:

two electrodes of different polarity;

a proton-conducting membrane electrolyte disposed between said two electrodes;

at least one of said two electrodes having a gas-side surface and an electrolyte-side surface;

said at least one of said two electrodes being formed with pores, said pores being permeable for a gas from said gas-side surface to said electrolyte-side surface and said pores having respective pore inlet openings and pore outlet openings; and said pore inlet openings have a first total area and said pore outlet openings have a second total area smaller than said first total area.

2. The fuel cell according to claim 1, wherein the first total area and the second total area have a ratio of at least 2:1.

3. The fuel cell according to claim 1, wherein the first total area and the second total area have a ratio of at least 3:1.

4. The fuel cell according to claim 1, wherein the first total area and the second total area have a ratio of substantially 4:1.

5. The fuel cell according to claim 1, wherein at least some of said pores are at least partially funnel-shaped such that said pores taper from said pore inlet openings toward said pore outlet openings.

6. The fuel cell according to claim 1, wherein at least some of said pores are at least partially step-shaped such that said pore inlet openings have first cross sections and said pore outlet openings have second cross sections smaller than respective ones of said first cross sections.

7. The fuel cell according to claim 1, wherein:
   said at least one of said two electrodes has at least two layers including a gas-side layer and an electrolyte-side layer; and
   said gas-side layer has predominantly first pores with first cross sections and said electrolyte-side layer has predominantly second pores with second cross sections smaller than said first cross sections.

8. The fuel cell according to claim 1, wherein said at least one of said two electrodes includes graphite.

9. The fuel cell according to claim 1, including at least one catalyst disposed in said pores and predominantly adjacent to said electrolyte-side surface.

10. The fuel cell according to claim 9, wherein said at least one catalyst contains a noble metal.

11. The fuel cell according to claim 9, wherein said at least one catalyst contains platinum.

\* \* \* \* \*